Dec. 31, 1957 F. L. HOWELL 2,817,870
COMBINED HINGE AND LATCH DEVICE
Filed Dec. 22, 1954 2 Sheets-Sheet 2

INVENTOR
FRANK LESTER HOWELL
BY Paul O. Pippel

ATTORNEY

United States Patent Office 2,817,870
Patented Dec. 31, 1957

2,817,870

COMBINED HINGE AND LATCH DEVICE

Frank Lester Howell, Fort Wayne, Ind., assignor to International Harvester Company, a corporation of New Jersey Application December 22, 1954, Serial No. 477,067

13 Claims. (Cl. 16—147)

This invention relates to a new and improved combined hinge and latch device and more particularly to a novel hinge and latch arrangement for automotive vehicle hood covers whereby the hood cover may be selectively raised or opened from either side of the hood body or, alternatively, the hood cover may be entirely removed from the vehicle body.

The prime objective of the present invention is the provision of a plurality of novel combined hinge and latch units or devices positioned in pairs along each side of the vehicle hood body to latch the hood cover to the hood body. Each pair of units is adapted to lock one side of the hood cover to the hood body and the units positioned on either side of the hood body may be actuated from within the operator's compartment to unlock the side of the hood cover associated with the particular units unlocked whereby the units on the opposite lock side function as a hinge to allow the hood cover to be raised or swung to an open position about a longitudinally extending axis.

Another object is the provision of an automobile hood cover hinge and latch arrangement for permitting quick and ready removal of the cover from the hood body.

A further object is to provide a hinge and latch device for automobile hood covers of the type capable of being opened from either side of the vehicle which is inexpensive to manufacture because of the simplicity of its design and construction.

The foregoing and other important objects and desirable features inherent in and encompassed by the invention, together with many of its purposes and uses thereof, will become readily apparent from a reading of the ensuing description in conjunction with the annexed drawings, in which:

Figure 3 is an enlarged view of one of the combined engine latch units showing the hood cover in its raised or opened position; the dotted lines represent the latch in its unlatched position; and Figure 4 is a view similar to Figure 3 showing the hood cover in its lowered or closed position.

Figure 1:
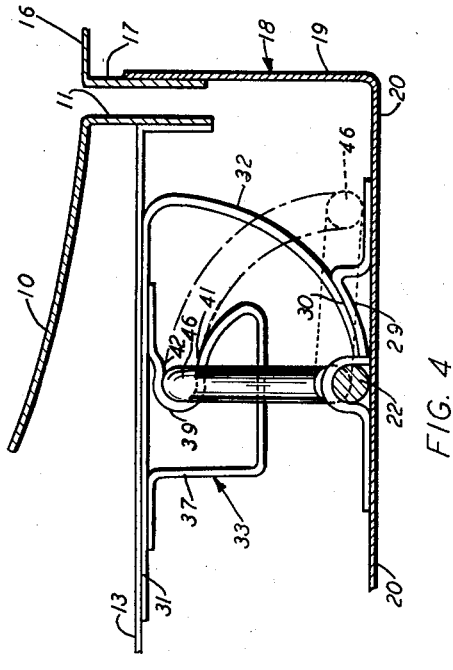
Figure 1 is a transverse vertical sectional view taken through the vehicle hood cover and a portion of the hood body showing the hood cover in its closed position; the dotted lines represent the hood cover in its opened or raised positions.

Referring to the drawings in detail, wherein like reference characters designate like elements throughout the various views, there is shown a vehicle hood cover 10 having its opposite side marginal edges defined by depending flanges 11 and 12, respectively. A pair of longitudinally spaced strainers or cross members 13 and 14 are rigidly secured to the underside of the hood cover 10 by any suitable means, such as by welding, and serve to strengthen and rigidify the hood cover structure. As in conventional motor vehicle construction, the engine is separated from the operator's compartment by the rearwardmost wall of the engine enclosure and such wall includes a dash panel 15, partially shown in the drawings.

A wheel housing or fender structure is mounted on the chassis frame adjacent each side of the vehicle power plant and, as partially shown in the drawings, includes a top section 16. The innermost edge of each fender top section 16 is in the form of a vertical flange 17. The flanges 17 are transversely spaced and parallel to flanges 11 and 12 when the hood cover 10 is in its normal, closed position. Inasmuch as the vehicle structure embodying the present invention includes combined hinge and latch devices along each of the transverse opposite sides of the hood cover 10 and since these combined hood and latch devices and the mounting structure therefor on one side of the vehicle hood 10 are substantially the same as those on the opposite side thereof, only the vehicle structure appearing on one side of the hood cover 10 will be described in detail.

As best shown in Figures 3, 4 and 5, the uppermost marginal edge of a splash panel 18 is rigidly fastened to the vertical flange 17. The splash panel 18 while only partially shown includes a vertical section 19 and a horizontal, inwardly extending section 20. The horizontal section 20 is spaced below the fender top section 16 and is normally covered by the hood cover 10 when in its closed position.

Positioned adjacent each side 11 and 12 of the hood cover 10 are two longitudinally spaced identical combined hinge and latch units or devices, designated generally by numeral 21. The units 21 positioned on one side are operable from within the vehicle operator's compartment to an unlatched condition in unison independently of the units located on the opposite side of the vehicle, as will be explained hereinafter. The horizontal section 20 of the splash panel 18 serves as a flat supporting ledge for mounting a control rod 22 and longitudinally spaced brackets 23. Each combined hinge and latch device or unit 21 includes a pair of the brackets 23. The brackets 23 are substantially T-shaped in plan with the body 24 of the T being transversely disposed. The head portion 25 of each bracket 23 is adapted to lie flat on the horizontal section 20 and be rigidly connected thereto by any suitable means. Extending transversely from each end of the head portion 25 are a pair of arcuately-shaped tabs 26 which are adapted to partially encircle portions of the control rod 22 and serve as bearing means for the control rod. The free end of the body 24 of each bracket 23 is substantially L-shaped in vertical section to provide a pad 27 which is rigidly secured to the horizontal section 20 of the splash panel 18 and a vertical leg 28. The section 29 integrally formed with and extending between the vertical leg 28 and the head portion 25 of the bracket 23 is arcuately shaped to provide a curved, upwardly facing surface 30 having a predetermined radius of curvature. The radius of curvature of the curved surface 30 of each bracket 23 is the same as the radii of curvature of the surfaces 30 of the other brackets 23. The purpose of such curved surfaces 30 will be pointed out hereinafter.

Each combined hinge and latch device or unit 21 further includes a flat plate 31 secured to the underside of a respective strainer 13, 14 adjacent a respective end thereof. Depending from the outer marginal edge of each flat plate 31 are a pair of longitudinally spaced, downwardly and inwardly curved legs 32. The legs 32 have substantially the same radii of curvature as the curved sections 29. The free end portions of the legs 32 are adapted to abut the curved surfaces 30 of the curved sections 29 when the hood cover is in its closed position to thereby support the hood cover 10 over the vehicle power plant, not shown.

A combination keeper and bearing element, generally designated by numeral 33, is secured to the underside of each flat plate 31 substantially midway between the legs 32 of the plate. The ends 34, 35 of the element 33 are adapted to lie flat against the plate 31 and be rigidly secured thereto by any suitable means. The element 33 includes a section 36 which is spaced below and is substantially parallel to the flat plate 31 and is disposed substantially horizontal when the hood cover 10 is in its closed position. The horizontal section 36, which is integrally formed with the end portion 34, is connected thereto by means of a vertical section 37. As best shown in Figures 3 and 4, a curved strip 38 is provided which is integrally formed with and extends away from the horizontal section 36 and toward the vertical section 37. The wall 39, integrally formed with the curved strip 38 and the attaching end 35 of the combination keeper and bearing element 33, is formed to provide a longitudinally extending pocket or socket. It will be noticed that the pocket is C-shaped in vertical section and the wall 39 where it merges with the curved guiding strip 38, as indicated by numeral 41, is spaced from the junction line, indicated by numeral 42, of the wall 39 with the attaching end 35 to provide a substantially rectangular-shaped opening 43, the vertical height of which is less than the internal diameter of the pocket 40.

Figure 2:
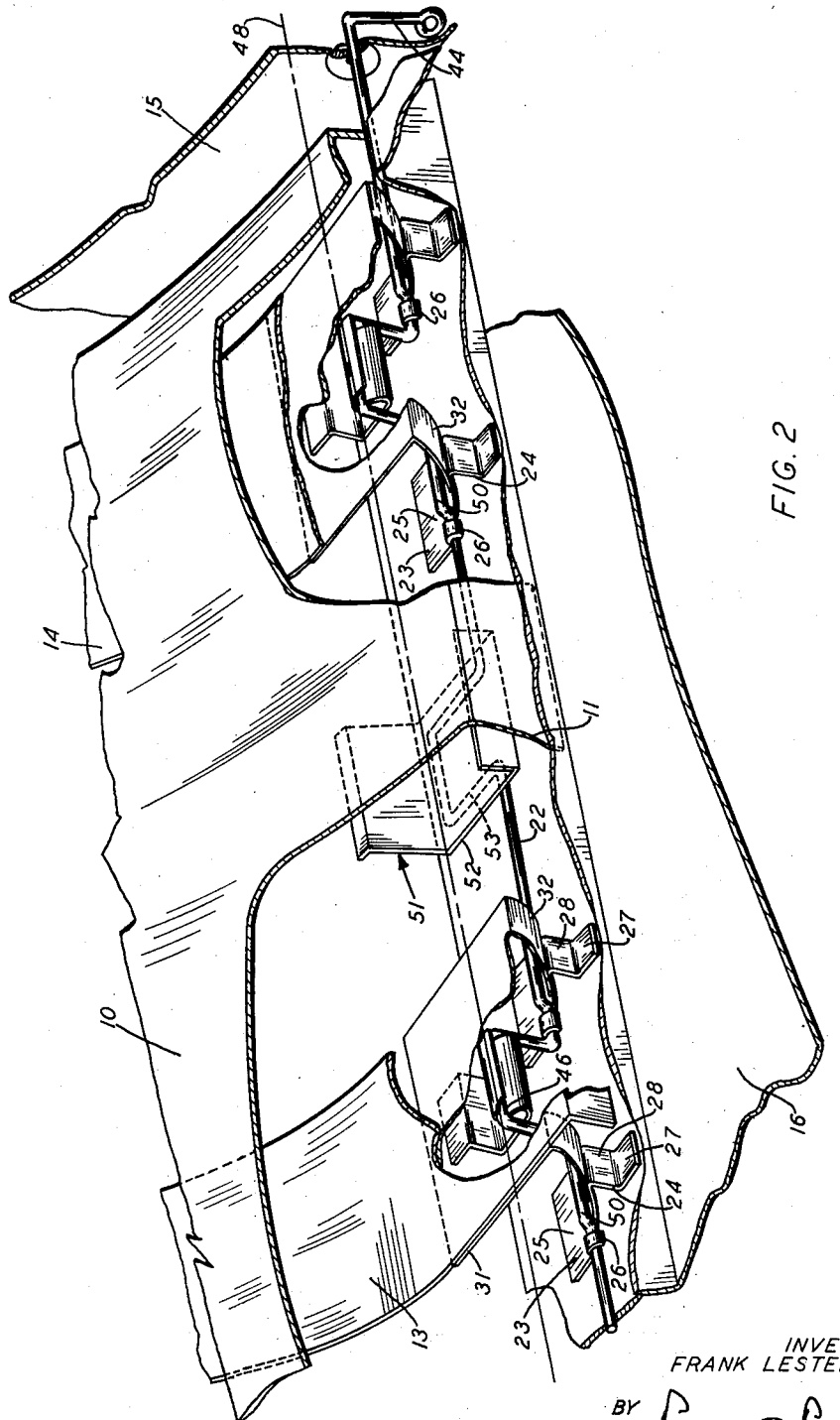
Figure 2 is a fragmentary perspective view of a pair of hinge and latch units positioned along one side of the hood body; portions of the hood cover and the vehicle fender adjacent thereto are broken away to better illustrate the invention.

The control rod 22, as stated hereinbefore, is rotatively mounted on the horizontal section 20 by means of the hook-like tabs 26. The control rod 22 extends through a suitable bearing in the dash panel 15 and is provided with an operating handle 44 which is disposed within the operator's compartment. Each control rod 22 is provided with a pair of longitudinally spaced, crank portions 45, each of which includes a longitudinally extending cylindrical latch 46, which is radially spaced from the rotational axis of the control rod 22. The diameter of the latch 46 is substantially equal to, or slightly larger than the normal internal diameter of the pocket and is adapted to be rotatively received therein, as shown in Figure 2.

In use, when it is desired to attach the hood cover 10 to the vehicle body, the hood cover 10 is placed over the engine and positioned such that each free end portion of each curved leg 32 abuts a respective curved surface 30, the control rods having previously been rotated to the position shown by broken lines in Figure 4 wherein the latches 46 are resting on the horizontal sections 20. Thereafter, each control rod 22 is individually rotated causing the crank portions 45 to swing upwardly and inwardly whereby the latches 46 move through an arc of approximately 90 degrees. During the later portion of such movement of the latches 46, each latch engages a respective strip 38 to be guided thereby into a respective pocket and the latches when entering and positioned within the pockets tend to force the free end portions of the curved legs 23 into firm abutting engagement with the curved surfaces 30. Since the openings 43 are smaller in area than the longitudinal cross sectional area of the latches 46, as pointed out hereinbefore, it is necessary that the openings 43 be capable of enlarging to accommodate the passage of the latches into the pockets. The combination keeper and bearing elements 33 are made of sheet metal having some resiliency, and because of the construction of the element 33 with the curved strip 38, horizontal section 36 and vertical section 37, the latches tend to cam the wall portions 41 and 42, which define the openings 43, away from each other to enlarge the openings 43 during the later portion of arcuate movement of the latches 46 from their respective unlocked positions, to their locked position, shown in Figure 3. Once a particular latch 46 is positioned within a pocket 40, wherein the wall 39 encircles more than half the peripheral area of the latch, there is a tendency for the wall portions 41, 42 to approach each other and assume a normal, space relationship, as shown in Figures 3 and 4. From the foregoing it will be appreciated that when each of the control rods 22 is actuated so that the latches 46 are each disposed within a respective pocket, curved legs 32 are pressed firmly into engagement with the curved surfaces 30 of the sections 27 and the hood cover 10 is securely fastened to the vehicle structure and is prevented from moving relatively thereto.

The full lines of Figure 1 show the hood cover 10 in its closed or lowered position, which position is maintained by means of the combined hinge and latch devices 21. As stated hereinbefore, each side of the hood cover 10 is adapted to be unlocked by means of actuating structure operable internally of the vehicle. Thus, when it is desired to swing the hood cover 10 to its open position from the right side of the vehicle, as an example, as viewed in Figure 1, the operating handle 44 of the control rod 22 mounted on the right side of the vehicle is grasped by the operator from within the operator's compartment and rotated approximately 90 degrees causing the latches 46 associated with such control rod 22 to be removed from the pockets disposed on the right side of the hood cover 10 and assume positions as shown in Figure 5. The hood cover 10 is then swung counterclockwise, as viewed in Figure 1, to the open position, illustrated by broken lines, about a longitudinally extending axis 48 passing through the pockets located on the left-hand side of the hood cover 10. The latches 46 of the combined hinge and latch devices 21 on the left-hand side of the hood cover 10 remain in their latched position and during the swinging movement of the hood cover 10 to its open position the legs 32 slide along the curved surfaces 30. It will be appreciated that while the inner surfaces 47 of the left-hand pockets frictionally engage the latches 46 and function as a bearing for the latches 46 during such swinging movement of the hood cover 10, most of the weight of the cover is transmitted to the left-hand horizontal section 20 through the legs 32 and their respective curved surfaces 30. As stated hereinbefore, the curvature of the legs 32 corresponds substantially to the curvature of the contacting surfaces 30 of the bracket sections 29 and the radii of curvature of the abutting surfaces is substantially equal to the length of a line extending normally from a respective longitudinal axis 48, 49 to a point located between the abutting surfaces. Thus, the abutting surfaces being curvilinear, the cover 10 is supported by the surfaces when the cover 10 is in its normal closed position and they also serve as bearing means for pivotally supporting hood cover 10 during swinging movement thereof from one side or the other of the vehicle. Suitable brace means, not shown, may be employed for maintaining the hood cover 10 in its raised position.

The hood cover 10 is closed by swinging it clockwise downwardly until the leg portions 32 disposed on the right side of the hood cover abut the curved sections 29 of the brackets 23 at which time the pockets on the right-hand side are in position for receiving the latches 46 of the right-hand control rod 22. The right-hand control rod 22 is then rotated to move the latches 46 into their respective pockets as described above.

When it is desired to open the hood cover 10 from the left side of the vehicle the procedure described above is followed except that the left side operating handle 44 is rotated to unlatch the left side hinge and latch devices 21 and the right side hinge and latch devices 21 provide the pivotal connection of the hood cover 10 with the hood body to permit swinging movement about a longitudinally extending axis 49 transversely spaced and parallel to the longitudinal extending axis 48 and which extends through the pockets of the right side keeper and bearing elements 33. The entire hood cover 10 may be removed from the hood body by rotating both operating handles 44 to disengage all of the latches 46 from their respective pockets.

As best shown in Figure 2, the section of the control rod 22, extending between each pair of tabs 26, is offset slightly in the same direction as the crank portions 45. The offset portions, or sections, 50 of the control rod 22 are provided to prevent the hood cover 10 from being accidentally disconnected from the vehicle body when in its raised or opened position. Referring to Figure 3, it will be noted that the legs 32 of the hinge and latch devices 21, serving as hinge means when the other hinge and latch devices on the opposite side of the hood are unlatched and the hood is swung upwardly to its raised position, slide between the offset sections 50 and the curved surfaces 30. The vertical spacing between the offset portions 50 and their respective curved surfaces 30 is just sufficient to accommodate passage of the legs 32; and it will thus be apparent that the side edge of the hood cover, about which the hood cover is being pivoted, is prevented from being disconnected, inadverently, from the hood body.

The invention also contemplates a simple and sturdy structure for raising the side of the hood cover 10 from the vehicle body when the control rod 22, associated with that particular side, is rotated to its unlatched position. As shown in Figure 2, an L-shaped bracket 51 is rigidly secured to the underside of the hood cover 10 adjacent the side marginal edge thereof and substantially mid-way between the cross members 13 and 14. The bracket 51 includes a flat, horizontally disposed abutment plate 52 which is adapted to be vertically spaced above, and substantially parallel, to a respective horizontal section 20 of one of the splash panels 18 when the hood cover 10 is in its normal closed position. A crank portion 53, integrally formed with the control rod 22 and angularly disposed substantially 90° from the crank portions 45, is adapted to be disposed beneath the abutment plate 52 when the control rod 22 is in its locked position. It will be appreciated that when control rod 22 is rotated to effect unlocking of the hood-cover side associated therewith, such unlocking movement of the control rod effects swinging of the crank portion 53 into engagement with the abutment plate 52. The vertical height between the abutment plate and the horizontal section 20 and the radial distance the crank portion 53 is offset from the axis of rotation of the control rod 22 determine the number of degrees the control rod 22 has to be rotated from its locked position to its unlocked position before the crank portion 53 engages the abutment plate 52. The vertical spacing of the abutment plate 52 from the horizontal section 20 and the radial length of the crank portion 53 are chosen so that the control rod 22 is rotated sufficiently to free the latches 46 from engagement with their respective keepers before the crank portion 53 engages the abutment plate. Thereafter, continued rotation of the control rod 22 to its fully unlocked position will cause the hood cover 10 to be cammed upwardly by the crank portion 53. The hood cover 10 can then be conveniently gripped along the raised end edge thereof to be lifted to its fully opened position. This feature of the invention is important since, as stated hereinbefore, the top section 16 of the wheel housing adjacent each side of the hood cover lies in substantially the same plane as the edges of the hood cover when the hood cover 10 is in its normal closed position and since the adjacent edges of the wheel housing and hood cover 10 are spaced relatively close to each other, it would be virtually impossible to effect lifting of the hood cover to swing the same to its open position, even though a particular side of the hood cover was unlatched from the vehicle body. This would be the case if some means were not provided for lifting the released side of the hood cover to enable the vehicle operator to grip the side edge of the hood cover to raise the same.

The embodiment of the invention chosen for the purposes of illustration and description herein is that preferred for achieving the objects of the invention and developing the utility thereof in the most desirable manner, due regard being had to existing factors of economy, simplicity of design in construction, and the improvement sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle engine enclosure having a pair of transversely spaced, fixed side walls and a hood cover swingable from either side about either one of a pair of transversely spaced, longitudinally extending axes with respect to said side walls from a close position wherein said hood cover bridges said side walls, structure for mounting said hood cover on said side walls including, a plurality of brackets secured to each side wall having downwardly and inwardly curved, upwardly facing surfaces; a curved projection for each of said surfaces depending downwardly and inwardly from said hood cover and having a curvilinear surface conforming to a respective bracket curved surface and being adapted to abut the same when said hood cover is in its closed position, a longitudinally extending latch keeper secured to each side of said hood cover having a substantial C-shape in vertical section, the longitudinal axis of each latch keeper being substantially coincident with a respective swinging axis of said hood cover and with the axis of curvature of said projection curvilinear surfaces disposed along a respective side of said hood cover, a latch mechanism supported by each enclosure side wall including a longitudinally extending cylindrical latch swingable about a longitudinally extending axis, each of said latches being swingable between a locked position wherein the latch is disposed within a respective keeper and a released position wherein the latch is without its respective keeper, the longitudinal axis of each latch when disposed within a respective keeper being coincident with a respective pivotal axis of said hood cover whereby when one latch is disposed within its respective latch keeper and the other disposed without its respective latch keeper the hood cover may be swung about the longitudinal axis of the latch keeper having a latch disposed therein, said locked latch mechanism maintaining respective bracket and projection curved surfaces in abutting engagement but permitting sliding movement therebetween when the hood cover is swung.

2. Structure for mounting said hood cover on said side walls substantially as set forth in claim 1, including means operatively connected to and swingable in unison with each latch, each of said means imparting a force to said hood cover when the latch swingable therewith is swung from its locked position to its released position to pivot the hood cover about the longitudinal axis of the latch keeper having a latch disposed therein on the opposite side of the engine enclosure.

3. A combined hinge and latch unit for a motor vehicle hood adapted to be pivotally swung to an open position about either one of two longitudinally extending axes, comprising, a first curved hinge element attached to a fixed portion of the vehicle body; a second curved hinge element fixed to said hood cover adapted to seat on and having a curvature conforming to said first hinge element, the axis of curvature of said hinge elements being substantially coincident with one of the pivotal axes of said hood cover; and releasable latch means for maintaining said first and second hinge elements in engagement but permitting relative sliding movement therebetween when in a locked position whereby said hood cover may be swung about said one pivotal axis of said hood cover, said latch means being operable to a released position to permit disengagement of said first and second hinge elements and swinging of said hood cover about the other of said hood cover pivotal axes, said latch means including a portion disposed on one side of said seating hinge elements when said latch means is in its released position and on the opposite side in its locked position, said releasable latch means including a generally longitudinally extending control rod mounted on said fixed portion of the vehicle body for rocking movement, the rocking axis of said control rod being vertically spaced below said one pivotal axis of said hood cover; said releasable latch means portion including a longitudinally extending cylindrical latch radially offset from the rocking axis of said control rod and movable with said control rod, said releasable latch means further including a latch keeper element attached to said hood cover, said latch being engageable with said latch keeper element to maintain said first and second hinge elements in engagement, the longitudinal axis of said latch being coincident with said one pivotal axis of said hood cover when engaged with said latch keeper element.

4. A combined hinge and latch unit substantially as set forth in claim 3, in which, said control rod further includes a longitudinally extending radially offset portion angularly disposed with respect to said latch and an abutment plate secured to the underside of said hood cover, said abutment plate being vertically spaced above said second offset portion when said hood cover is in its closed position and being in the path of movement of said second offset portion when said control rod is rocked to disengage said latch from said keeper element to thereby effect pivoting of said hood cover about the other of said hood cover pivotal axes.

5. In a motor vehicle engine enclosure including a fixed part and a hood cover swingable from either side about either one of a pair of longitudinally extending axes with respect to said fixed part; structure for mounting said hood cover on said fixed part including a first curved hinged element attached to a fixed portion of a vehicle body, said hinge element curving downwardly and inwardly; a second curved hinge element fixed to said hood cover adapted to seat on and having a curvature conforming to said first hinged element, said second hinge element depending downwardly and inwardly from said hood cover, the axis of curvature of said abutting hinge elements being substantially coincident with one of the pivotal axes of said hood cover; and releasable latch means for maintaining said first and second hinge elements in engagement during pivotal movement of said hood cover between its closed position about said one pivotal axis of said hood cover, said latch means being operable to permit disengagement of said first and second hinge elements and swinging of said hood cover about the other of said hood cover pivotal axes, said latch means including a generally longitudinally extending control rod supported on a fixed portion of a vehicle body for rocking movement about a longitudinally extending axis vertically spaced below and substantially parallel to said one pivotal axis of said hood cover, a longitudinally extending latch keeper element having a substantially C-shape in vertical section, the longitudinal axis of said latch keeper element being substantially coincident with said one pivotal axis of said hood cover, said control rod having a radially offset portion to provide a cylindrical, longitudinally extending latch adapted to be swung to a locked position wherein said latch is disposed within said latch keeper element, portions of said latch keeper element defining the opening for passage of said latch being resiliently urged toward each other and are normally spaced from each other a distance less than the diameter of said latch, and additional means carried by said control rod for maintaining said first and second hinge elements in abutting engagement during swinging movement of said hood cover about said one pivotal axis, including a second radially offset portion on said control rod adapted to be spaced vertically above said first hinge element when said control rod is in its latch position a distance just sufficient to permit sliding of said second hinge element between said first hinge element and said second offset portion when said hood cover is swung about said one pivotal axis.

6. In a motor vehicle engine enclosure having a fixed part and a hood cover mounted on said fixed part for selective pivotal movement from either side of the enclosure about either one of two transversely spaced, longitudinally extending axes, means for mounting said hood cover on said fixed part including a pair of transversely spaced, downwardly and inwardly extending surfaces carried by said fixed part; a curvilinear surface carried by each side of said cover conforming to and adapted to abut a respective curved surface carried by said fixed part, the axis of curvature of each of said curvilinear surfaces being coincident with a respective longitudinal extending pivotal axis of said hood cover; and manually operable means associated with each pair of abutting surfaces for maintaining said surfaces in abutting engagement, each manually operable means being individually operable to permit disengagement of the abutting surfaces associated therewith whereby said hood cover may be pivoted to an open position, said manually operable means including a generally longitudinally extending control rod mounted on said fixed part for rocking movement about a longitudinally extending axis, said control rod having a crank portion to provide a longitudinally extending cylindrical latch, a bracket secured to the underside of said hood cover adjacent the curved surface depending therefrom, said bracket being formed with a longitudinally extending latch keeper element having a substantially C-shape in vertical section to provide a rectangular opening, the portions of said latch keeper element defining said opening being resiliently urged toward each other whereby said opening has a normal area less than the cross sectional area of said latch.

7. A combined engine latch unit for an automobile vehicle hood cover comprising a first bracket rigidly fastened to a hood body having a portion thereof formed to provide a downwardly and inwardly curved, upwardly facing surface; a plate secured to said hood cover and having a curved leg portion depending downwardly and inwardly therefrom and having a curvilinear surface conforming to the curved surface of said first bracket and adapted to abut the same when said hood cover is in its lowered, closed position; a longitudinally extending, keeper means secured to said hood cover adjacent said leg portion, said keeper means having an opening therein, the longitudinal axis of said keeper opening being substantially coincident with the axis of curvature of said leg portion curvilinear surface; latch mechanism secured to said fixed part of the engine enclosure including a longitudinally extending cylindrical latch swingable about a longitudinally extending axis, said latch being swingable between a locked position wherein said latch is inserted and retained in said keeper opening to maintain said curved surfaces in abutting engagement and is disposed on one side of said curved abutting surfaces and an unlocked position wherein said latch is disposed on the opposite side of said abutting surfaces and removed from said keeper opening and said surfaces are free to move out of abutting engagement with each other.

8. In a motor vehicle engine enclosure having a fixed part and a hood cover mounted on said fixed part for selective pivotal movement about either side of the enclosure about either one of two transversely spaced longitudinally extending axes, means for mounting said hood cover on said fixed part including a pair of transversely spaced, downwardly and inwardly extending surfaces carried by said fixed part; a curvilinear surface carried by each side of said hood cover conforming to and adapted to abut a respective curved surface carried by said fixed part, the axis of curvature of each of said curvilinear surfaces being coincident with a respective longitudinally extending pivotal axis of said hood cover; and manually operable means associated with each pair of abutting surfaces for maintaining such surfaces in abutting engagement, each manually operable means being individually operable to permit disengagement of the abutting surfaces associated therewith whereby said hood cover may be pivoted to an open position, each of said manually operable means including a longitudinally extending cylindrical portion disposed on one side of a pair of abutting surfaces associated therewith to maintain such abutting surfaces in engagement and disposed on the opposite side of said pair of abutting surfaces to permit disengagement of said abutting surfaces, each manually operable means including a control rod supported by said fixed part for rocking movement about a longitudinal axis, each of said cylindrical portions defining a latch radially spaced from the longitudinal axis of a respective control rod and rockable therewith; and a keeper fastened to each side of said hood cover adjacent a respective curvilinear surface for engaging a respective latch, the longitudinal axis of said keeper being substantially coincident with a respective pivotal axis of said hood cover.

9. In a motor vehicle engine enclosure substantially as set forth in claim 8, in which, an arm is integrally formed with each control rod which is engageable with the hood cover during unlatching movement of the latch for effecting partial pivoting of the hood cover about the longitudinal axis of the engaged latch keeper element, said arm being angularly offset with respect to a respective latch.

10. In a motor vehicle engine enclosure having a fixed part and a hood cover mounted on said fixed part for selective pivotal movement from either side the enclosure about either one of two transversely spaced, longitudinally extending axes, means for mounting said hood cover on said fixed part including a plurality of brackets secured to said fixed part along each side thereof, each of said brackets having downwardly and inwardly curved portions to serve as first hinge elements, a plurality of plates secured to the underside of said hood cover along each side thereof, said plates having curvilinear projections depending therefrom conforming to and adapted to abut respective curved portions carried by said fixed part, the axes of curvature of each of said curvilinear projections being coincident with a respective longitudinally extending pivotal axis of said hood cover, and a pair of manually operable means, each manually operable means being associated with the cooperating projections and curved portion on a respective side of said engine enclosure for maintaining said projections and curved portions in abutting engagement, said manually operable means including a pair of transversely spaced brackets secured to the underside of said hood cover, each of said brackets being formed to provide a keeper element having a C-shape in vertical section to provide a rectangular opening, the portions of said keeper element defining said opening being resiliently urged toward each other whereby said portions are spaced from each other a distance less than the normal internal diameter of said keeper element, and a generally longitudinally extending control rod mounted on said fixed part for rocking movement about a longitudinally extending axis, said control rod having a bail-like portion to provide a longitudinally extending cylindrical latch, the diameter of said latch being substantially equal to the internal diameter of a respective keeper element and having a longitudinal axis when disposed within a respective keeper element which is coincident with a respective pivotal axis of said hood cover, each manually operable means being individually operable to permit disengagement of the cooperating surfaces associated therewith whereby said hood cover may be pivoted to an open position about the pivotal axis of the hood cover disposed on the opposite side of the engine enclosure.

11. The mounting structure substantially as set forth in claim 10, in which, each of said control rods is provided with a second offset portion longitudinally spaced with respect to a respective bail-like portion, said second offset portion being adapted to be spaced vertically above at least one of said curved portions when said control rod is in its latched position a distance just sufficient to permit sliding of the curved projection associated therewith between said curved portion and said second offset portion when said hood cover is swung about the pivotal axis of the hood cover associated therewith.

12. In a motor vehicle engine enclosure substantially as set forth in claim 11, in which, each control rod is provided with means engageable with said hood cover during unlatching movement thereof for effecting partial disengagement of said first and second hinge elements associated therewith.

13. In a motor vehicle engine enclosure having a fixed part and a hood cover mounted on said fixed part for selective pivotal movement from either side of the enclosure about either one of two transversely spaced, longitudinally extending axes; means for mounting said hood cover on said fixed part including a plurality of brackets secured to said fixed part along each side thereof, each of said brackets having downwardly and inwardly curved portions to serve as first hinge elements, a plurality of plates secured to the underside of said hood cover along each side thereof, said plates having curvilinear projections depending therefrom conforming to and adapted to abut respective curved portions carried by said fixed part, the axes of curvature of each of said curvilinear projections being coincident with a respective longitudinally extending pivotal axis of said hood cover, and a pair of manually operable means, each manually operable means being associated with the cooperating projections and curved portions on a respective side of said engine enclosure including a longitudinally extending keeper element having an opening therein, a longitudinally extending cylindrical latch supported for swinging movement on said fixed part about a longitudinal axis, said cylindrical latch being swingable to one side of said cooperating projections and curved portions into said keeper opening for maintaining said projections and curved portions in abutting engagement, the longitudinal axis of each latch when disposed within a respective keeper opening being coincident with a respective pivotal axis of said hood cover, each manually operable means being individually operable to swing said latch to the opposite side of the cooperating surfaces associated therewith to permit disengagement of the cooperating surfaces associated therewith whereby said hood cover may be pivoted to an open position about the pivotal axis of the hood cover disposed on the opposite side of the engine enclosure.

References Cited in the file of this patent

UNITED STATES PATENTS

| 1,356,774 | Lanchester | Oct. 26, 1920 |
| 1,815,540 | Black | July 21, 1931 |
| 2,672,942 | Bayley | Mar. 23, 1954 |